United States Patent [19]
Frische et al.

[11] Patent Number: 5,493,623
[45] Date of Patent: Feb. 20, 1996

[54] PZT FIBER OPTIC MODULATOR HAVING A ROBUST MOUNTING AND METHOD OF MAKING SAME

[75] Inventors: Richard H. Frische, Phoenix; Dick Ang, Glendale, both of Ariz.

[73] Assignee: Honeywell Inc., Minneapolis, Minn.

[21] Appl. No.: 267,093

[22] Filed: Jun. 28, 1994

[51] Int. Cl.$^6$ .............................. G02B 6/10; G01B 9/02; B29D 11/00
[52] U.S. Cl. .................... 385/12; 385/2; 385/3; 385/39; 385/137; 356/345; 356/350; 264/124; 264/127; 264/1.1
[58] Field of Search ............................... 385/1, 2, 3, 8, 385/12, 13, 24, 39, 40, 41, 42, 137, 136; 356/345, 349, 350; 264/1.24, 1.25, 1.27, 1.1

[56] References Cited

U.S. PATENT DOCUMENTS

| | | | |
|---|---|---|---|
| 4,530,603 | 7/1985 | Shaw et al. | 356/345 |
| 4,875,775 | 10/1989 | Michal et al. | 356/350 |
| 5,095,514 | 3/1992 | Curtis | 385/12 |
| 5,101,449 | 3/1992 | Takeuchi et al. | 385/3 |
| 5,150,435 | 9/1992 | Washimi | 385/1 |
| 5,208,652 | 5/1993 | Sonobe et al. | 356/350 |
| 5,260,768 | 11/1993 | Cordova et al. | 356/350 |
| 5,311,592 | 5/1994 | Udd | 380/9 |
| 5,327,213 | 7/1994 | Blake et al. | 356/350 |
| 5,327,214 | 7/1994 | Asami | 356/350 |
| 5,333,214 | 7/1994 | Huang et al. | 385/12 |
| 5,377,283 | 12/1994 | Blake et al. | 385/12 X |
| 5,381,230 | 1/1995 | Blake et al. | 356/345 |

*Primary Examiner*—Brian Healy
*Attorney, Agent, or Firm*—John G. Shudy, Jr.

[57] ABSTRACT

A piezoelectric fiber optic phase modulator having a mount at a nodal point of the vibratory system of the modulator. The modulator is excited with an electric field applied in a direction parallel to the axis of the modulator or perpendicular to the radial direction of movement of the modulator. In contrast to the mere hollow cylinder modulator of the related art, the modulator of this invention has a web or center structure integral with the inside surface of the cylinder. The modulator here has a rugged mount, low absorption vibration and negligible harmonics at the mount for efficient and high Q functioning, and has rugged electrical connections for dependable operation.

27 Claims, 12 Drawing Sheets

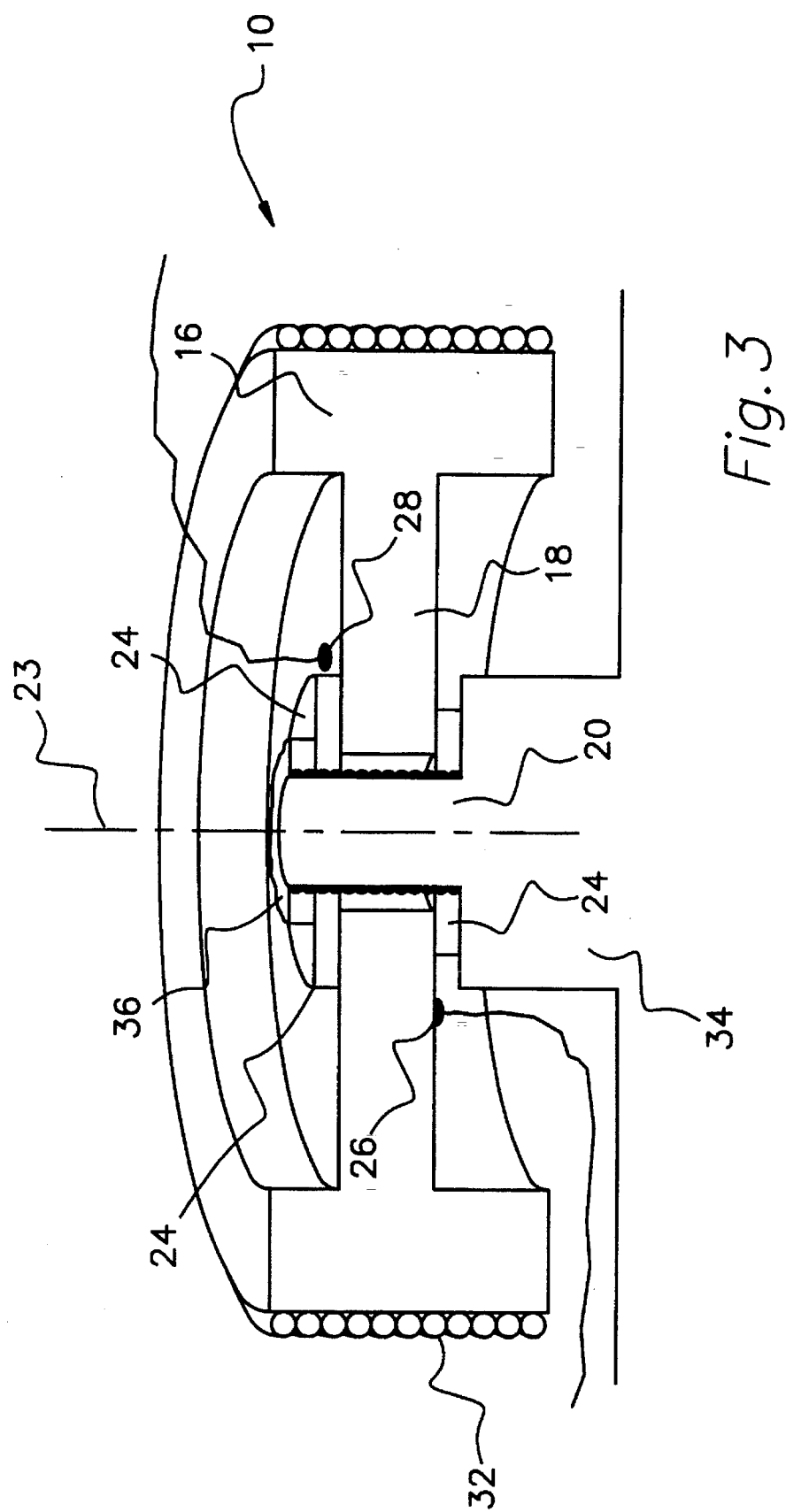

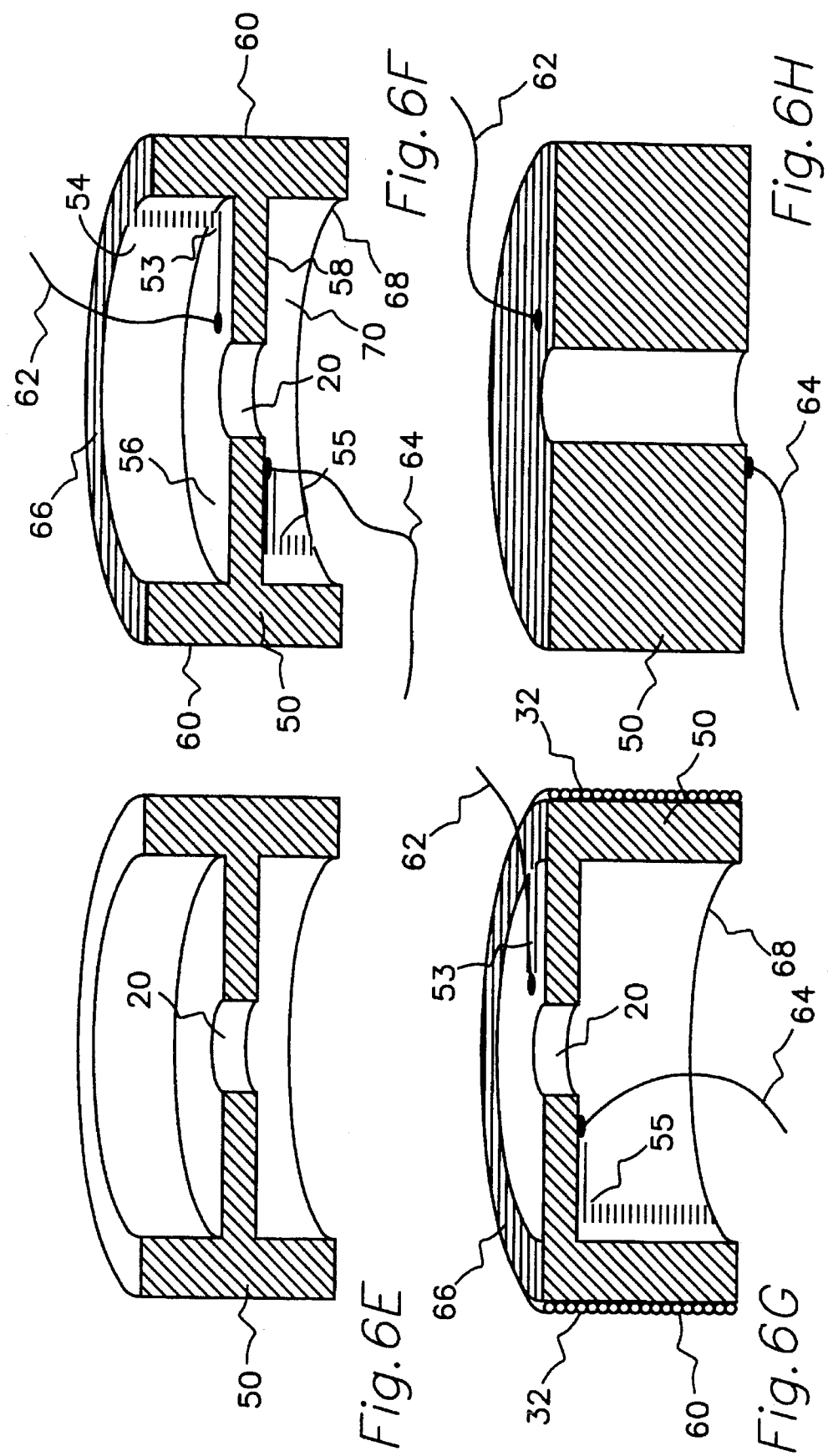

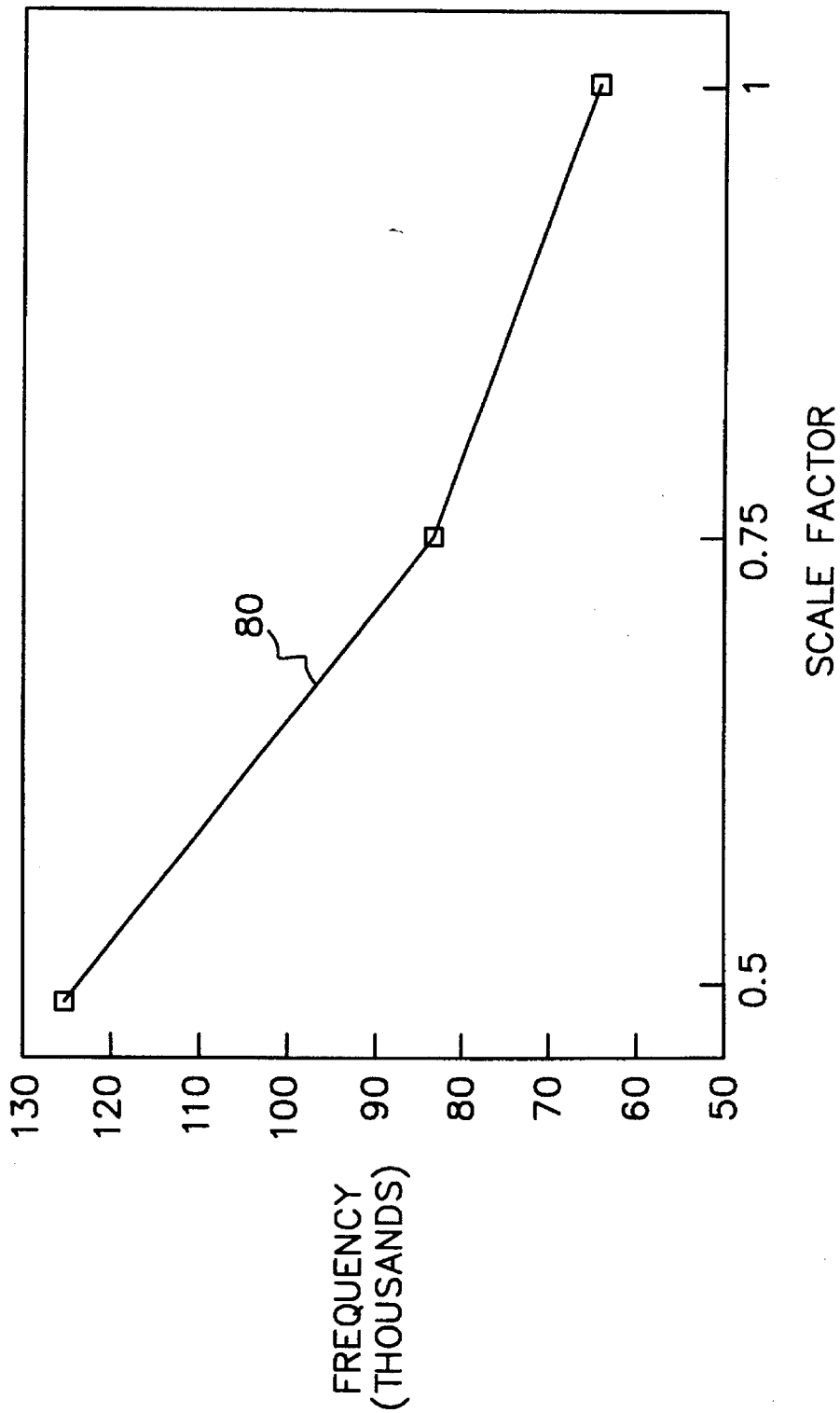

PZT FIBER OPTIC MODULATOR HAVING A ROBUST MOUNTING AND METHOD OF MAKING SAME

BACKGROUND OF THE INVENTION

The invention relates to light signal phase modulators and particularly to phase modulators for fiber optic gyroscopes. More particularly, the invention pertains to modulators having fiber-supporting cores constructed from piezoelectric (PZT) material.

Fiber optic gyroscopes are an attractive means with which to sense rotation of an object supporting such a gyroscope. Such gyroscopes can be made quite small and can be constructed to withstand considerable mechanical shock, temperature change, and other environmental extremes. Due to the absence of moving parts, they can be nearly maintenance free, and they have the potential of becoming economical in cost. They can also be sensitive to low rotation rates that can be a problem in other kinds of optical gyroscopes.

A fiber optic gyroscope has a coiled optical fiber wound on a core and about the axis thereof around which rotation is to be sensed. The optical fiber is typical of a length of 100 to 2,000 meters, or so, and is part of a closed optical path in which an electromagnetic wave, or light wave, is introduced and split into a pair of such waves to propagate in opposite directions through the coil to both ultimately impinge on a photodetector. Rotation about the sensing axis of the core, or the coiled optical fiber, provides an effective optical path length increase in one rotational direction and an optical path length decrease in the other rotational direction for one of these waves. The opposite result occurs for rotation in the other direction. Such path length differences between the waves introduce a phase shift between these waves for either rotation direction, i.e., the well-known Sagnac effect. This gyroscope is known as the interferometric fiber optic gyro (IFOG). The use of a coiled optical fiber is desirable because the amount of phase difference shift due to rotation, and so the output signal, depends on the length of the entire optical path through the coil traversed by the two electromagnetic waves traveling in opposed direction, and so a large phase difference can be obtained in the long optical fiber but in the relatively small volume taken by it as a result of being coiled.

The output current from the photodetector system photodiode, in response to the opposite direction traveling electromagnetic waves impinging thereon after passing through the coiled optical fiber, follows a raised cosine function. That is, the output current depends on the cosine of the phase difference between these two waves. Since a cosine function is an even function, such an output function gives no indication as to the relative directions of the phase difference shift, and so no indication as to the direction of the rotation about the coil axis. In addition, the rate of change of a cosine function near zero phase is very small, and so such an output function provides very low sensitivity for low rotation rates.

Because of these unsatisfactory characteristics, the phase difference between the two opposite direction traveling electromagnetic waves is usually modulated by placing an optical phase modulator, or what is sometimes referred to as a bias modulator, in the optical path on one side of the coiled optical fiber. In order to achieve sensitive detection of rotation, the Sagnac interferometer is typically biased by a sinusoidal modulation of the differential phase between the counter-propagating beams within the interferometric loop. As a result, one of these opposite direction propagating waves passes through the modulator on the way into the coil while the other wave, traversing the coil in the opposite direction, passes through the modulator upon exiting the coil.

In addition, a phase-sensitive detector serving as part of a demodulator system is provided to receive a signal representing the photodetector output current. Both the phase modulator and the phase-sensitive detector can be operated by a sinusoidal signal generator at the so-called "proper" frequency to reduce or eliminate modulator induced amplitude modulation, but other waveform types of the same fundamental frequency can be used. Other frequencies can be used, and often are, to reduce the frequency to a more manageable value.

The resulting signal output of the phase-sensitive detector follows a sine function, i.e. the output signal depends on the sine of the phase difference between the two electromagnetic waves impinging on the photodiode, primarily the phase shift due to rotation about the axis of the coil in the absence of occurrence of other significant but unwanted phase shifts. A sine function is an odd function having its maximum rate of change at zero phase shift, and so changes algebraic sign on either side of zero phase shift. Hence, the phase-sensitive detector signal can provide an indication of which direction a rotation is occurring about the axis of the coil, and can provide the maximum rate of change of signal value as a function of the rotation rate near a zero rotation rate, i.e. the detector has its maximum sensitivity for phase shifts near zero so that its output signal is quite sensitive to low rotation rates. This is possible, of course, only if phase shifts due to other sources, that is, errors, are sufficiently small. In addition, this output signal in these circumstances is very close to being linear at relatively low rotation rates. Such characteristics for the output signal of the phase-sensitive detector are a substantial improvement over the characteristics of the output current of the photodetector without optical phase modulation.

An example of such a system from the prior art is shown in FIG. 1. The optical portion of the system contains several features along the optical paths to assure that this system is reciprocal, i.e. that substantially identical optical paths occur for each of the opposite direction propagating electromagnetic waves except for the specific introductions of non-reciprocal phase difference shifts, as will be described below. The coiled optical fiber forms a coil 32, about a core or spool using a single mode optical fiber wrapped about the axis around which rotation is to be sensed. The use of a single mode fiber allows the paths of the electromagnetic or light waves to be defined uniquely, and further allows the phase fronts of such a guided wave to also be defined uniquely. This greatly aids maintaining reciprocity.

In addition, the optical fiber can be so-called polarization-maintaining fiber in that a very significant birefringence is constructed in the fiber so that polarization fluctuations introduced by unavoidable mechanical stresses, by the Faraday effect in magnetic fields, or from other sources, which could lead to varying phase difference shifts between the counter-propagating waves, become relatively insignificant. Thus, either the high refractive index axis, i.e. the slower propagation axis, or the low index axis is chosen for propagating the electromagnetic waves depending on the other optical components in the system. In the present system, the slow axis has been chosen in view of the optical components used therein.

The electromagnetic waves which propagate in opposite directions through coil 32 are provided from an electromagnetic wave source, or light source 37, in FIG. 1. This source is typically a laser diode which provides electromagnetic waves, typically in the near-infrared part of the spectrum, with a typical wavelength of 830 nm. Source 37 must have a short coherence length for emitted light to reduce the phase shift difference errors between these waves due to Rayleigh scattering at scattering sites in coil 32. Because of the nonlinear Kerr effect in coil 32, different intensities in the two counter propagating waves can lead to different phase shifts therebetween. This situation can be overcome also by use of a short coherence length source for source 37.

Between laser diode 37 and fiber optic coil 32 there is shown an optical path arrangement in FIG. 1 formed by the extension of the ends of the optical fiber forming coil 32 to some optical coupling components which separate the overall optical path into several optical path portions. A portion of polarization-maintaining optical fiber is positioned against laser diode 37 at a point of optimum light emission therefrom, a point from which it extends to a first optical directional coupler 39.

Optical directional coupler 39 has light transmission media therein which extend between four ports, two on each end of that media, and which are shown on each end of coupler 39 in FIG. 1. One of these ports has the optical fiber extending from laser diode 37 positioned thereagainst. At the other port on the sense end of the optical directional coupler 39 there is shown a further optical fiber positioned thereagainst which extends to be positioned against a photodiode 41, which is electrically connected to a photodetection system 43.

Photodiode 41 detects electromagnetic waves, or light waves, impinging thereon from the portion of the optical fiber positioned thereagainst and provides a photo current in response. This photocurrent, as indicated above, in the case of two nearly coherent light waves impinging thereon, follows a cosine function in providing a photocurrent output which depends on the cosine of the phase difference between such a pair of substantially coherent light waves. This photodetection device will operate into a very low impedance to provide the photocurrent which is a linear function of the impinging radiation, and may typically be a p-i-n photodiode.

Optical directional coupler 39 has another optical fiber against a port at the other end thereof which extends to a polarizer 45. At the other port on that same side of coupler 39 there is a non-reflective termination arrangement 47, involving another portion of an optical fiber.

Optical directional coupler 39, in receiving electromagnetic waves, or light, at any port thereof, transmits such light so that approximately half thereof appears at each of the two ports of coupler 39 on the end thereof opposite that end having the incoming port. On the other hand, no such waves or light is transmitted to the port which is on the same end of coupler 39 as is the incoming light port.

Polarizer 45 is used because, even in a single spatial mode fiber, two polarization modes are possible in electromagnetic waves passing through the fiber. Thus, polarizer 45 is provided for the purpose of passing one of these polarization modes through the optical fiber, along the slow axis thereof as indicated above, while blocking the other. Polarizer 45, however, does not entirely block light in the one state of polarization that it is intended to block. Again, this leads to a small non-reciprocity between two opposite direction traveling electromagnetic waves passing therethrough and so a small non-reciprocal phase shift difference occurs between them which can vary with the conditions of the environment in which the polarizer is placed. In this regard, the high birefringence in the optical fiber used again aids in reducing this resulting phase difference, as indicated above.

Polarizer 45 has a port on either end thereof with the electromagnetic wave transmission medium contained therein positioned therebetween. Positioned against the port on the end thereof opposite that connected to optical directional coupler 39 is another optical fiber portion which extends to a further optical bidirectional coupler 49, which has the same wave transmission properties as does coupler 39.

The port on the same end of coupler 49 from which a port is coupled to polarizer 45 again is connected to a non-reflective termination arrangement 51, using a further optical fiber portion. Considering the ports on the other end of coupler 49, one is connected to further optical components in the optical path portions extending thereto from one end of the optical fiber in coil 32. The other port in coupler 49 is directly coupled to the remaining end of optical fiber 32. Between coil 32 and coupler 49, on the side of coil 32 opposite the directly connected side thereof, is provided an optical phase modulator 10. Optical phase modulator 10 has two ports on either end of the transmission media contained therein shown on the opposite ends thereof in FIG. 1. The optical fiber from coil 32 is positioned against a port of modulator 10. The optical fiber extending from coupler 49 is positioned against the other port of modulator 10.

Optical modulator 10 is capable of receiving electrical signals to cause it to introduce a phase difference in electromagnetic waves transmitted therethrough by changing the index of refraction of the transmission medium, or transmission media, therein to thereby change the optical path length. Such electrical signals are supplied to modulator 10 by a bias modulation signal generator 30, providing a sinusoidal voltage output signal at a modulation frequency $f_g$ that is intended to be equal to $C_1 \sin(\omega_g t)$ where $\omega_g$ is the radian frequency equivalent of the modulation frequency $f_g$. Other suitable periodic waveforms could alternatively be used.

This completes the description of the optical portion of the system of FIG. 1 formed along the optical path followed by the electromagnetic waves, or light waves, emitted by source 37. Such electromagnetic waves are coupled from that source through the optical fiber portion to optical directional coupler 39. Some of such wave entering coupler 39 from source 37 is lost in non-reflecting terminating arrangement 47 coupled to a port on the opposite end thereof, but the rest of that wave is transmitted through polarizer 45 to optical directional coupler 49.

Coupler 49 serves as a beam-splitting apparatus in which electromagnetic waves entering the port thereof, received from polarizer 45, split approximately in half with one portion thereof passing out of each of the two ports on the opposite ends thereof. Out of one port on the opposite end of coupler 49 an electromagnetic wave passes through optical fiber coil 32, modulator 10, and back to coupler 49. There, a portion of this returning wave is lost in non-reflective arrangement 51 connected to the other port on the polarizer 45 connection end of coupler 49, but the rest of that wave passes through the other port of coupler 49 to polarizer 45 and to coupler 39 where a portion of it is transmitted to photodiode 41. The other part of the wave passed from polarizer 45 to coil 32 leaves the other port on the coil 32 end of coupler 49, passes through modulator 10, and optical fiber coil 32 to re-enter coupler 49 and, again, with a portion thereof following the same path as the other portion to finally impinge on photodiode 41.

As indicated above, photodiode 41 provides an output photocurrent, $i_{PD41}$, proportional to the intensity of the two electromagnetic waves or light waves impinging thereon, and is therefore expected to follow the cosine of the phase difference between these two waves impinging on that diode as given by the following equation:

$$i_{PD_{41}} = \frac{I_o}{2} [1 + \cos(\phi_R + \phi_m \cos \omega_g t)]$$

This is because the current depends on the resulting optical intensity of the two substantially coherent waves incident on photodiode 41, an intensity which will vary from a peak value of $I_o$ to a smaller value depending on how much constructive or destructive interference occurs between the two waves. This interference of waves will change with rotation of the coiled optical fiber forming coil 32 about its axis as such rotation introduces a phase difference shift of $\phi_R$ between the waves. Further, there is an additional variable phase shift introduced in this photodiode output current by modulator 10 with an amplitude value of $\phi_m$ and which is intended to vary as $\cos(\omega_g t)$. The photodetector 41 goes to a signal component selection device 67.

Optical phase modulator 10 is of the kind described above and is used in conjunction with a phase-sensitive detector as part of a demodulation system for converting the output signal of photodetection system 43, following a cosine function as indicated above, to a signal following a sine function. Following such a sine function provides in that output signal, as indicated above, information both as to the rate of rotation and the direction of that rotation about the axis of coil 32.

Thus, the output signal from photodetection system 43, including photodiode 41, is converted to a voltage and provided through an amplifier 61, where it is amplified and passed through a filter 63, to such a phase sensitive detector means 65. Photo-detection system 43, amplifier 61, filter 63 and phase-sensitive detector 65 constitute the signal component selection device 67. Phase-sensitive detector 65, serving as part of a phase demodulation system, is a well known device. Such a phase-sensitive detector extracts the amplitude of the first harmonic of the filtered photodiode system output signal, or the fundamental frequency of modulation signal generator 30, to provide an indication of the relative phase of the electromagnetic waves impinging on photodiode 41. This information is provided by phase-sensitive detector 65 in an output signal following a sine function, that is, this output signal follows the sine of the phase difference between the two electromagnetic waves impinging on photodiode 41. An output from phase-sensitive detector 65 goes to rotation rate indicator 69.

Bias modulator signal generator 30, in modulating the light in the optical path at the frequency $f_g$ described above, also leads to harmonic components being generated by the recombined electromagnetic waves in photodetection system 43. Filter 63 is a bandpass filter which is to pass the modulation frequency component of the output signal of photodetector 43, i.e. the first harmonic, after its amplification by amplifier 61.

In operation, the phase difference changes in the two opposite direction propagating electromagnetic waves passing through coil 32 in the optical path, because of rotation, will vary relatively slowly compared with the phase difference changes due to modulator 10. Any phase differences due to rotation, or the Sagnac effect, will merely shift the phase differences between the two electromagnetic waves. The amplitude scaling factor of the modulation frequency component of the output signal of photodetection system 43, appearing at the output of filter 63, is expected to be set by the sine of this phase difference modified further only by the factors of a) the amplitude value of the phase modulation of these waves due to modulator 10 and generator 30, and b) a constant representing the various gains through the system. Then, the periodic effects of this sinusoidal modulation due to generator 30 and modulator 10 in this signal component are expected to be removed by demodulation in the system containing phase-sensitive detector 65 leaving a demodulator system (detector) output signal depending on just the amplitude scaling factor thereof.

Thus, the voltage at the output of amplifier 61 will typically appear as:

$$v_{61-out} = k\{1 + \cos [\phi_R + \phi_m \cos (\omega_g t + \theta)]\}$$

The constant k represents the gains through the system to the output of amplifier 61. The symbol, $\theta$, represents additional phase delay in the output signal of amplifier 61 with respect to the phase of the signal provided by generator 30. Some of this phase shift will be introduced in photodetection system 43, and some will be due from other sources such as a phase shift across modulator 10 between the phase of the signals supplied by generator 30 and the response of modulator 10 in having the index of refraction of the media therein, and/or its length, correspondingly change. The other symbols used in the preceding equation have the same meaning as they did in the first equation above.

The foregoing equation can be expanded in a Bessel series expansion to give the following:

$$v_{61-out} = k[1 + J_0(\phi_m)\cos\phi_R] - 2kJ_1(\phi_m)\sin\phi_R\cos(\omega_g t + \theta) -$$
$$2kJ_2(\phi_m)\cos\phi_R\cos2(\omega_g t + \theta) + 2kJ_3(\phi_m)\sin\phi_R\cos3(\omega_g t + \theta) +$$
$$\sum_{n=2}^{\infty} [(-1)^n 2kJ_{2n}(\phi_m)\cos\phi_R\cos2n(\omega_g t + \theta) +$$
$$(-1)^n 2kJ_{2n+1}(\phi_m)\sin\phi_R\cos(2n+1)(\omega_g t + \theta)]$$

This signal at the output of amplifier 61 is applied to the input of filter 63.

Filter 63, as indicated above, passes primarily the first harmonic from the last equation, i.e. the modulation frequency component. As a result, the output signal of filter 63 can be written as follows:

$$v_{63-out} = -2kJ_1(\phi_m) \sin \phi_R \cos (\omega_g t + \theta + \psi_1)$$

The further phase delay term appearing, $\psi_1$, is the additional phase shift in the first harmonic term added as a result of passing through filter 63. This added phase shift is expected to be substantially constant and a known characteristic of filter 63.

The signal from filter 63 is then applied to phase-sensitive detector 65, as is the signal from bias modulator generator 30, the latter again intended to be equal to $C_1 \sin(\omega_g t)$ where $\omega_g$ is the radian frequency equivalent of the modulation frequency $f_g$. Assuming that a phase shift equal to $\theta + \omega_1$ can be added by phase-sensitive detector 65 to its output signal, the output of that detector with such a generator 30 output signal will then be the following:

$$V_{65-out} = k'J_1(\phi_m) \sin \phi_R$$

The constant k' accounts for the system gains through phase-sensitive detector 65.

However, these expected results may not be achieved in the system of FIG. 1. One reason for failing to achieve the expected results is that bias modulation signal generator 30, in modulating the light in the optical path at frequency $f_g$ as described above through phase modulator 10, not only results in harmonic components being generated in photo-detection system 43 by the recombined electromagnetic waves, but also directly supplies some harmonic components in the varying optical path phase because of nonlinearities occurring both in generator 30 and modulator 10.

That is, as a first possibility, the output signal supplied by modulation generator 30 at its output may contain not only a fundamental signal at frequency $f_g$, but also significant harmonics thereof. Even if a signal free of such harmonics could be provided, nonlinear component characteristics and hysteresis in phase modulator 10 can result in introducing such harmonics into the varying phase provided thereby in the optical path. Such harmonics can lead to significant rate bias errors in the output signal of the fiber optic gyroscope. Thus, there is desired an interferometric fiber optic gyroscope in which such errors due to the modulation system are reduced or eliminated. The present invention accomplishes this task.

The related art phase modulator generally uses a cylindrical (or pipe-like) fiber-supporting structure made from PZT material. Optic fiber is wrapped around the outer surface of, for instance, a hollow PZT cylinder. Electrical excitation to the electrodes causes the PZT cylinder to vibrate at its first cylindrical mode, that is, to contract and expand symmetrically along its radius (for instance, with the applying of an AC field to the PZT material). The expansion and contraction results in the fiber being stretched and unstretched and thus, via the photo-elastic effect of the fiber, results in a light-wave phase modulator. However, the problem with the related art phase modulator is that there is no stationary front where the vibrating cylindrical modulator can be supported rigidly, that is, there is no convenient vibrational nodal point or a place on the modulator having near-zero vibration, appropriate for mounting. The mounting of a contracting and expanding cylinder at its center is difficult to achieve effectively and inexpensively. A preferred mounting is one that utilizes a nodal support so as not to disturb the vibration mode of the modulator and "stiff" enough to provide a rugged support. Such a mounting is not apparent among related art PZT optic fiber modulators. A solid PZT cylinder with a center mount is stiff enough for rugged support but utilizes a nodal mount to permit an adequate vibration mode. The mounted solid cylinder is somewhat stiff and vibration in the longitudinal or axial direction is restrained due to the solid inner structure.

Some related art modulator construction methods involve clever but difficult means to support the PZT, for instance, the use of "O" rings or elastomers, at or from the inside edge of the PZT cylinder. Such mounting techniques are costly and result in phase modulators which produce much bias error over the operating temperature range.

Related-art PZT phase modulators have the inside and outside surfaces of the cylinder used as electrodes. Connectors or wires attached on these surfaces are susceptible to breakage or disconnection because the various vibrations in a direction perpendicular to the surfaces at these locations are particularly destructive to connections. Mass anomalies related to the lead connections on the PZT also cause perturbations to the fundamental cylindrical mode and affect the linearity of the phase modulator.

SUMMARY OF THE INVENTION

The present PZT modulator configuration eliminates the problems of the related art modulators by having a vibration node or a near-nodal point of the modulator for mounting. The present optic fiber phase modulator uses a specially formed PZT device. This device has a rim-like fiber support with a web inside. It is a "wheel" type design made of PZT material. The fiber for the modulator optic fiber coil is wound on the outside surface or rim, and has a center mounting at a "hub". One feature of the invention includes a mechanically very elegant mounting that is sufficiently "stiff" enough to sustain rugged environmental conditions and located at a nodal point away from the actual motion of the vibration so as not to disturb the vibration mode of the modulator. Lead attachments are made near the nodal point to minimize the distortion effects of the cylindrical mode caused by the leads. Another feature is that the design of invention results in low second harmonic effects sustained from its mounting during operation of the modulator, and a resulting "Q" factor that is better than related art modulators. Such mounting permits a clean signal to be superimposed on the light signal in the fiber. There is symmetry in both radial and axial directions of vibration.

BRIEF DESCRIPTION OF THE DRAWINGS

FIG. 3 shows the present modulator and mount.

FIGS. 6a–i show steps of fabrication of the PZT modulator core and several configurations of the modulator.

FIG. 8 is a graph of frequency versus size of the modulator.

DESCRIPTION OF THE PREFERRED EMBODIMENT

Figure 2A:
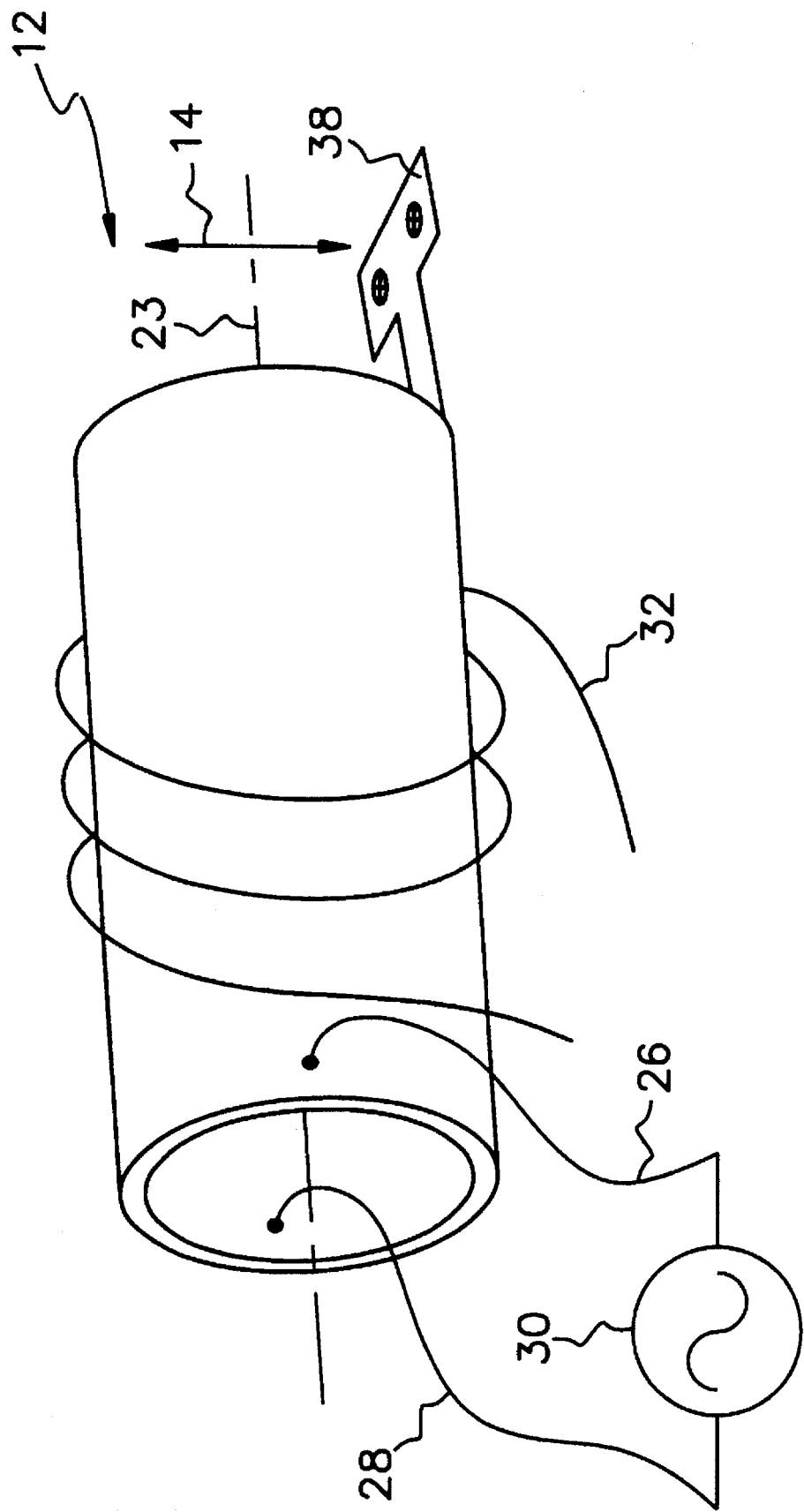
FIGS. 2a–2c show related art optic fiber PZT phase modulators.
Figure 4:
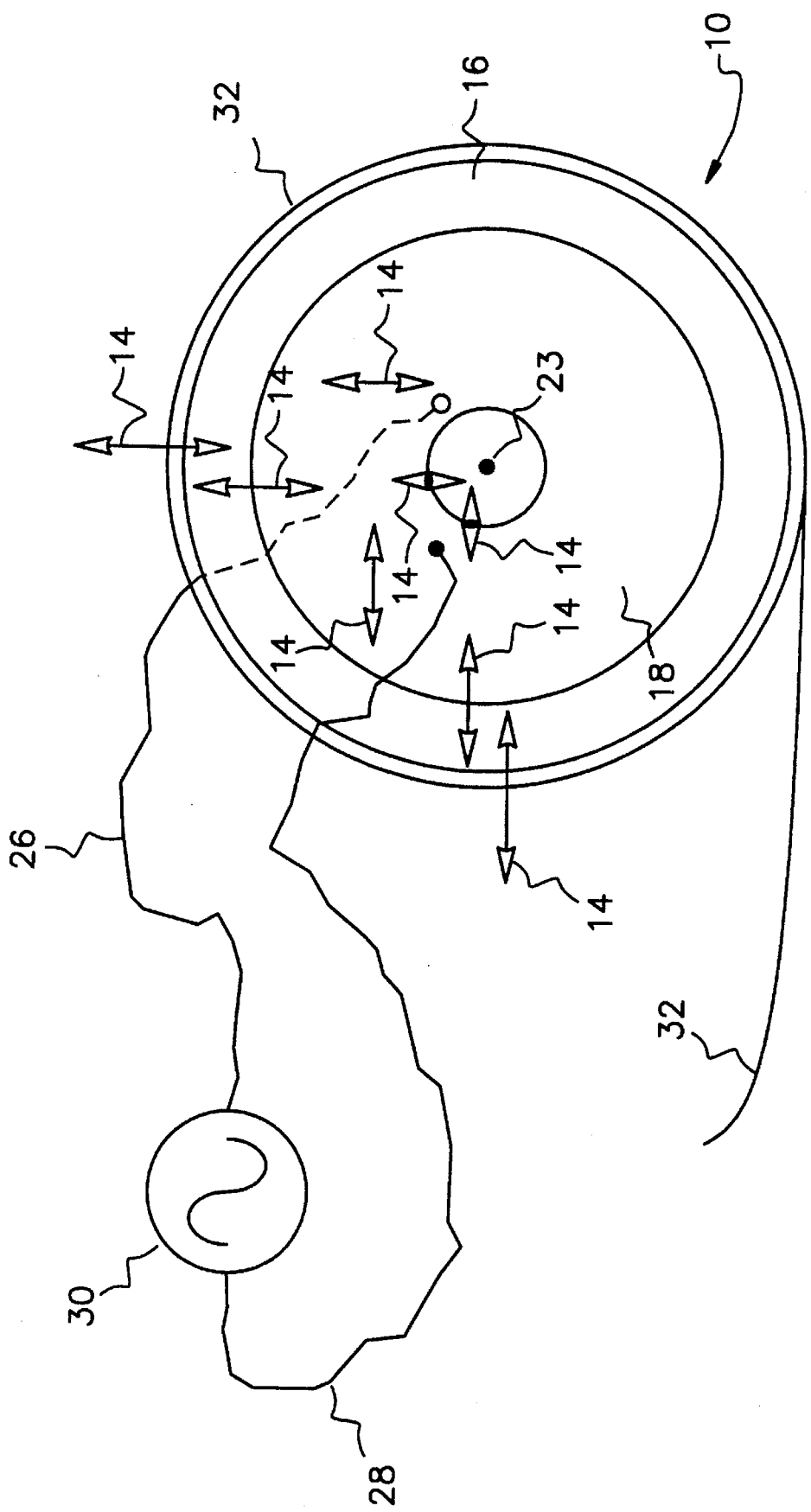
FIG. 4 is an end view of the present modulator showing various amplitudes of radial vibration.

The modulator 10 of FIG. 3, unlike related art modulator 12 in FIG. 2, has a mounting point close to center 23 of the PZT device where the vibration has a node (i.e., the vibration amplitude 14 is close to zero at center 23, as illustrated in FIG. 4, but not so in FIG. 2). This location 20 of the mounting for modulator 10 results in a high Q modulator functioning. Center 20 has very little effect on the remainder of the structure which has significant amplitudes 14 of vibratory motion. The present mounting at center 23 of modulator 10 is an easy and efficient way to support PZT modulator 10 in a robust manner, so as to resist rugged environmental conditions, have a high "Q" factor and permit an accurate modulation signal to be superimposed on the light signal in fiber 32 wound on modulator 10.

Figure 1:
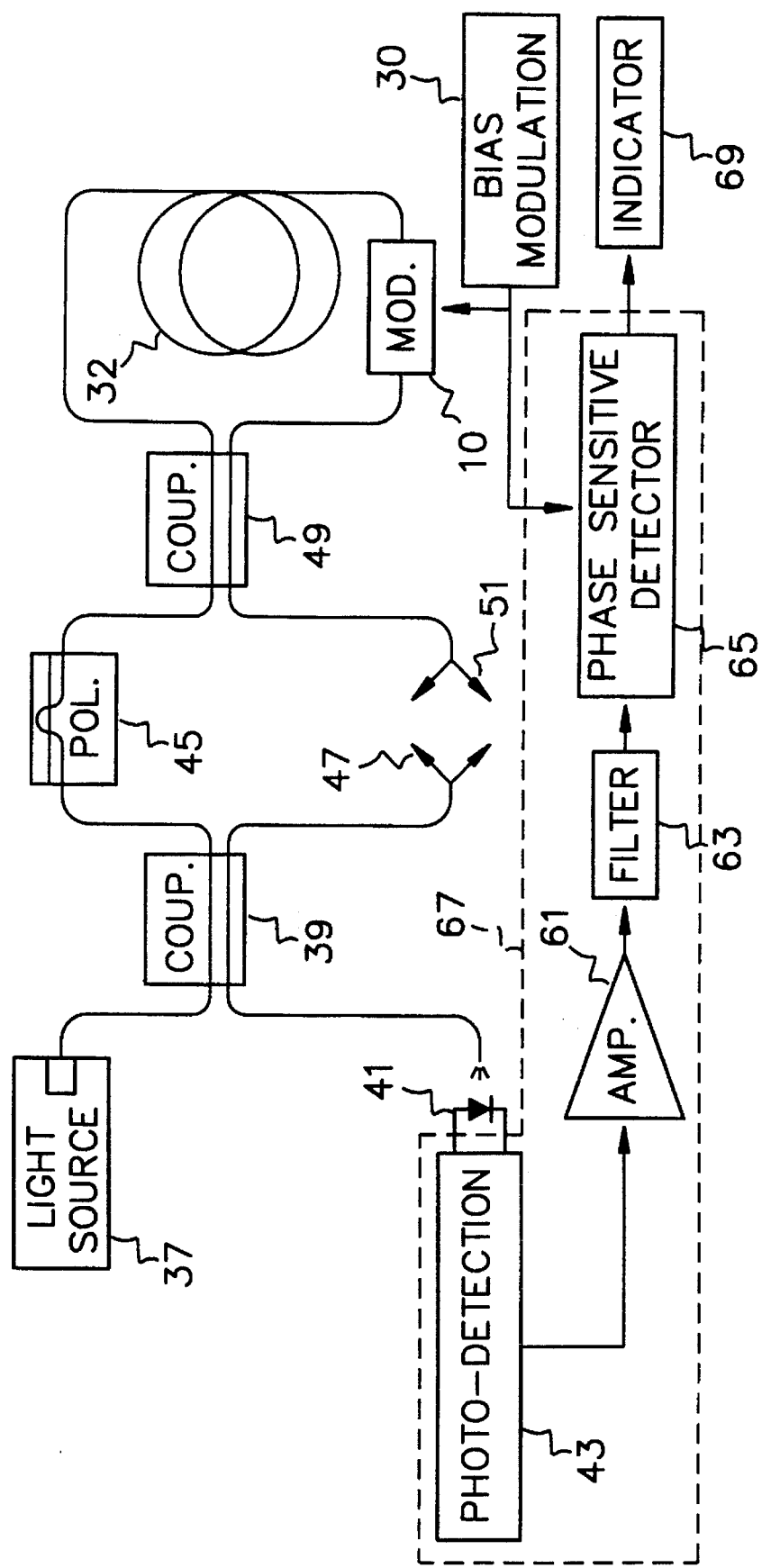
FIG. 1 shows a system schematic diagram of the present invention combining a signal processing arrangement and an optical transmission path and device arrangement.
Figure 2B:
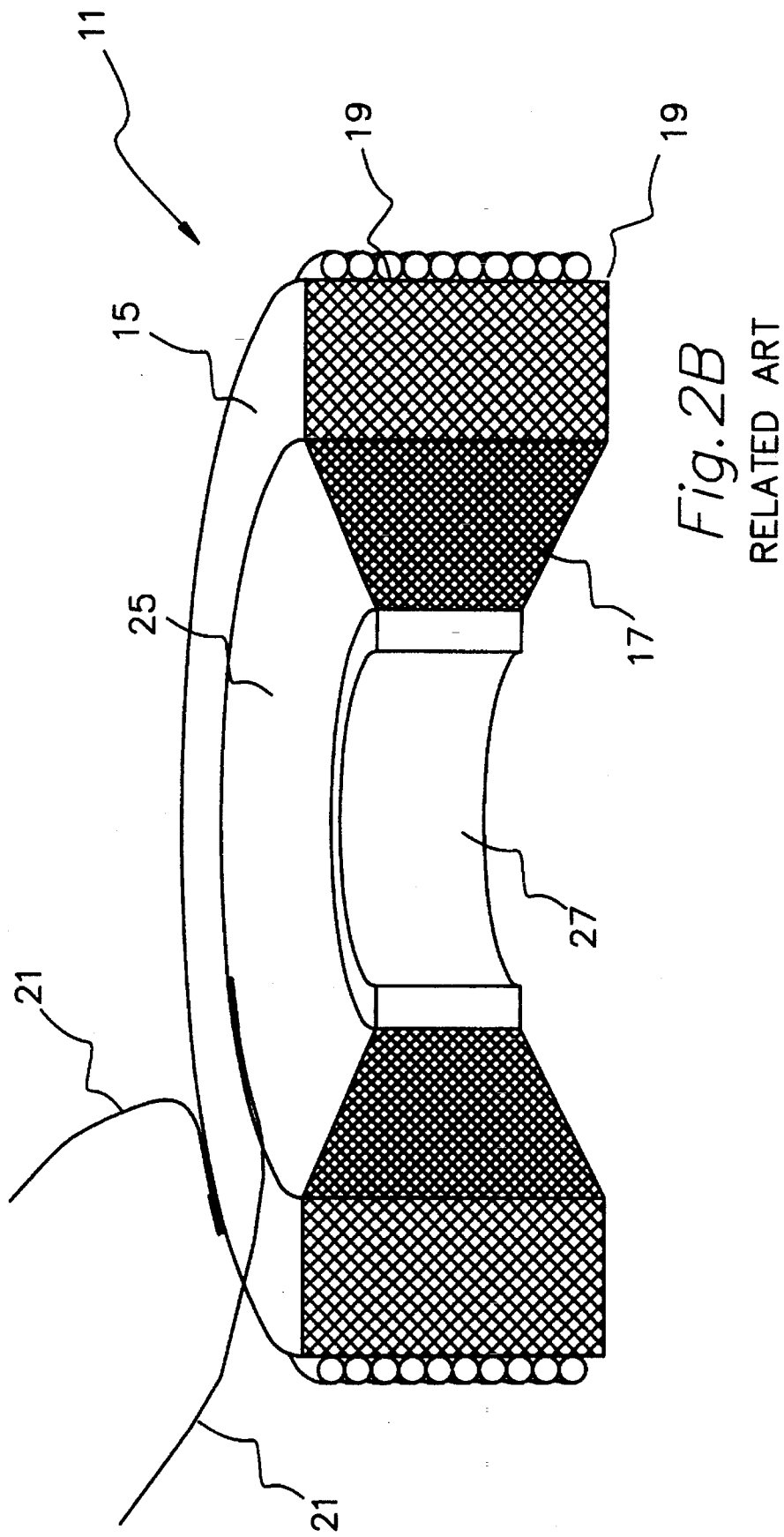
Figure 2C:
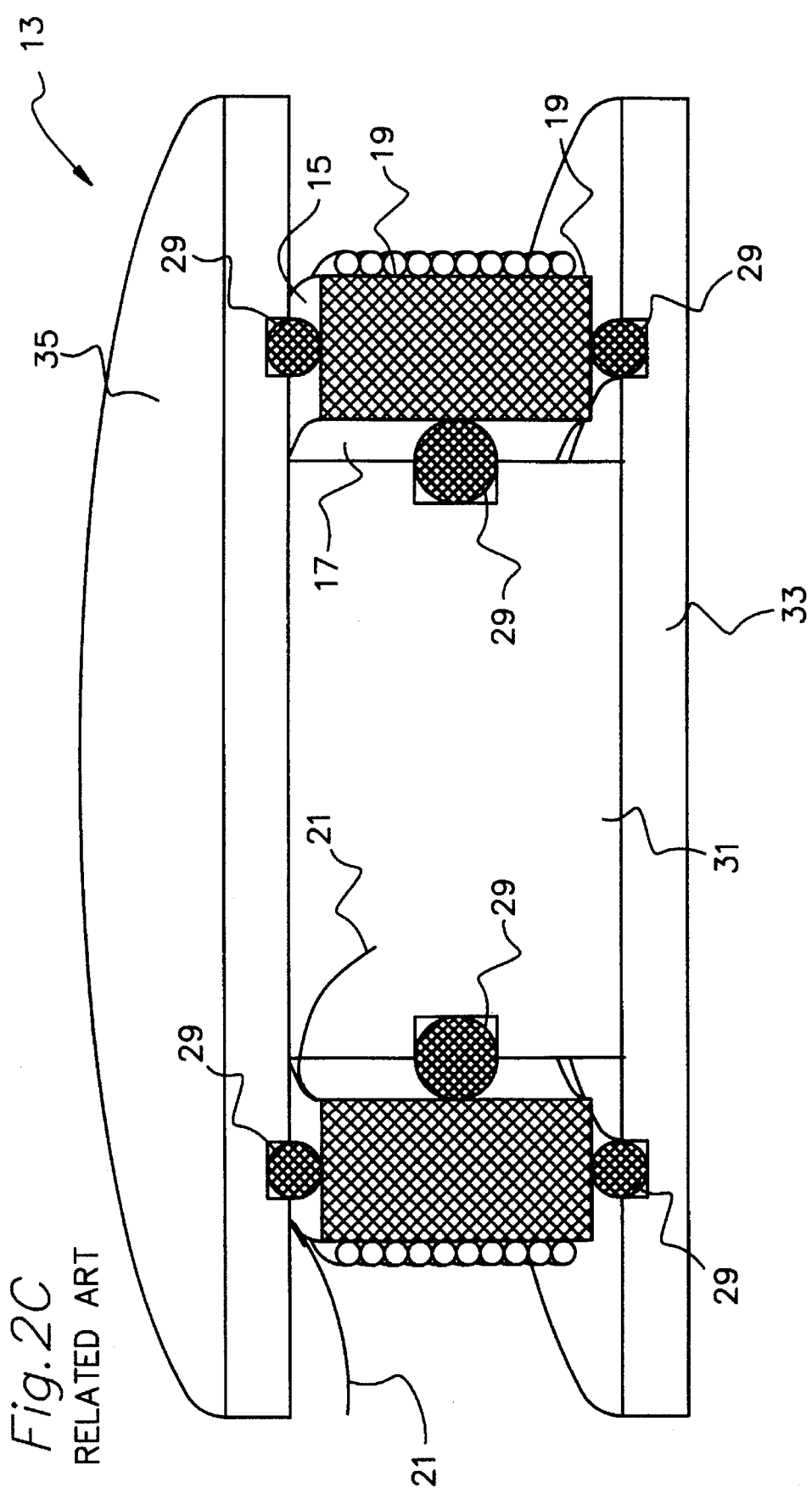

Center mountings have been attempted in the related art, as shown in FIGS. 2b and 2c. Related art modulator 11 of FIG. 2b has PZT ring 15 which is electroded with a conductive coating on inside surface 17 and outside surface 19. Leads 21 are attached to the inside and outside diameter edges of inside surface 17 and outside surface 19, respectively. PZT ring 15 is poled in a radial direction, and driven at a frequency that is determined by or related to inside diameter and outside diameter relationships. The related art approaches 11 and 13 attempt to hold or secure PZT ring so as not to interfere with the fundamental resonant motion. Soft elastomer material 25 holds PZT ring 15 to a metal mounting ring 27 in approach 11. In FIG. 1c, O-rings 29 hold PZT ring 15 to center mounting support 31, mounting base 33 and mounting cover 35. A major problem with configurations 11 and 13 is that soft elastomer 25 and O-rings 29, respectively, do not maintain their desired elastic properties over the temperature range of the modulators. Such changing of elastic properties results in changing vibratory interrelationships with PZT material of ring 15 and in distortions of the fundamental cylindrical motions and resulting modulation signals, which in turn have consequences of unstable bias with temperature and time.

Electrical leads 21 of configurations 11 and 13 are attached at points of maximum vibration and interact with the modulator vibration to cause maximum bias instability and destroy the symmetry of motion of the modulator. Also, leads 21 at their points of connection are quite vulnerable to breakage thereby resulting in modulators 11 and 13 having poor reliability.

In the present invention, PZT material 16 is formed or constructed as a wheel or cylinder with a center support disk or ring 18 made from the same PZT material, wherein the hollow cylinder portion is like a wide rim on a center wheel portion having a hub. In this configuration, center 23 of the PZT's core 18 (or phase modulator structure 18) is a nodal point, that is, the motion is practically zero when PZT structure 16 is under excitation and vibrating. Fiber 32 is wound around the outside surface of the "rim" or PZT structure 16. Structures 16 and 18 are integrated as one solid piece of the same PZT material. Structures 16 and 18 are either machined from a cylinder-like bulk PZT material or formed from a mold which is filled with a PZT material from which the combination structure of 16 and 18 is removed from the mold after the PZT material has solidified.

The mounting of the modulator 10 may be effected with a small bolt 20 (or shaft) and nut 36 to a pedestal 34 with elastomer washers 24. PZT 16 can be poled and thus electroded and connected with leads 26 and 28 and excited via end face electrodes on surfaces lateral to the vibration which makes connections much less susceptible to breakage than connections on surfaces that are perpendicular to their motion of vibration as in related art cylindrical modulator 12. Electrical excitation wires 26 and 28 also can be attached on the center "web" part 18 which does not vibrate as much as the outer edges of PZT 16. Since there is high Q mount due to modulator 10 support location 23 at or near a nodal point, mounting or pedestal 34 absorbs very little energy from vibrating modulator 10. Furthermore, less energy is coupled to mounting or bolt 20 and pedestal 34 as a result of "energy trapping" in that the inherent frequency of the outer ring is lower than center support 18. Therefore, acoustic energy does not transmit to mounting 20 as effectively to mounting 38 in related art structure 12. Secondary harmonic effects are smaller because the vibration system of modulator 10 is isolated through mounting at a vibrational node, resulting in less nonlinear errors than that of modulator 12, as significant nonlinearities can result from nonlinear absorption by mounting 38 of modulator structure 12. Modulator 10 has a good symmetry of motion and superimposes a clean and accurate modulation signal on the light signal in fiber 32.

Figure 5A:
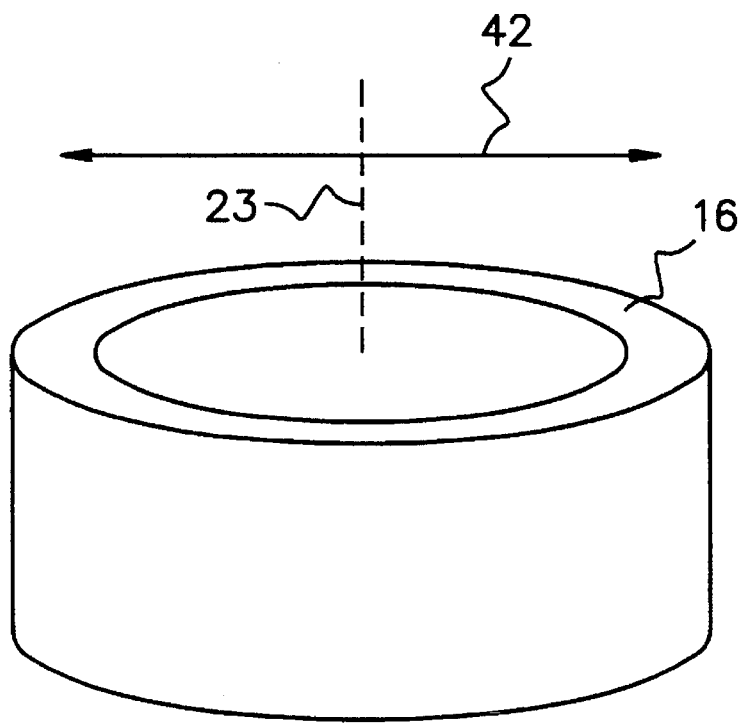
FIGS. 5a and 5b illustrate radial and axial vibration, respectively.
Figure 5B:
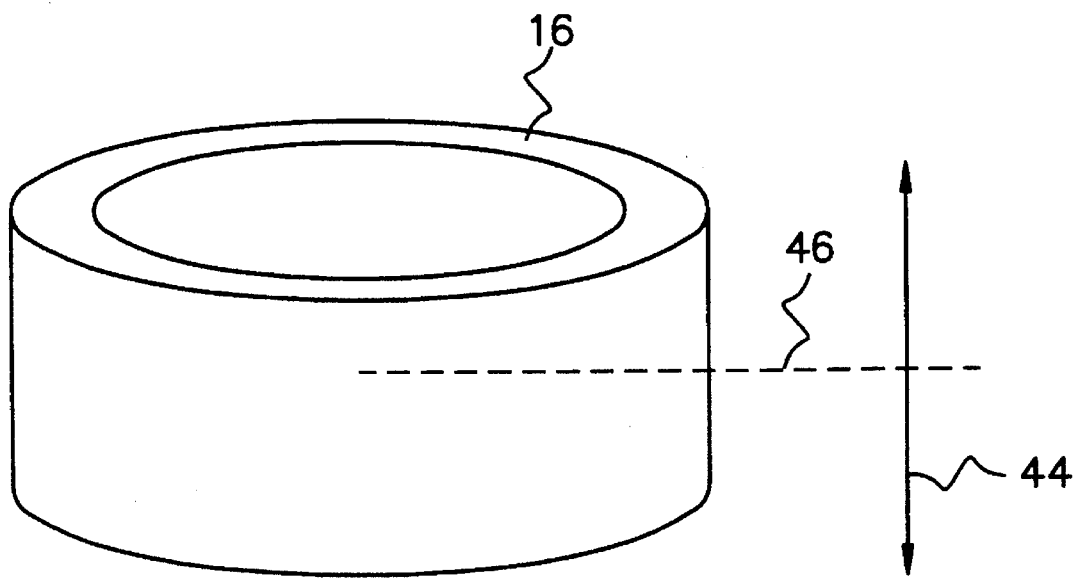

The physical dimensions of PZT transducer portions 16 and 18 relate to the operating frequency and resonance of the phase modulator 10. For increasing frequencies, the transducer dimensions decrease. The two displacements or dimension changes are a "breathing" or radial motion, i.e., the wheel diameter becomes larger and smaller, or changes size radially from axis 23 (FIG. 5a), and an axial or longitudinal displacement expanding to and from axis 46, or along axis 23, i.e., the width or thickness increases and decreases (FIG. 5b).

FIG. 8 is a graph, that shows the relationship of the modulator 10 resonant frequency and relative size according to curve 80. Several sets of dimensions of modulator 10 at certain frequencies are given in the following table. The dimensions are identified on the core shown in FIG. 6e which is the same configuration as that of FIG. 6f. Dimension 82 is the outside diameter; dimension 84 is the inside diameter; dimension 86 is the hole diameter; dimension 88 is the web thickness; and dimension 90 is the disk thickness.

| Basic Parameters Inches (Centimeters) | 1.0 Scale | 0.75 Scale | 0.5 Scale |
| --- | --- | --- | --- |
| Outside Diameter | 1 (2.540) | 0.75 (1.905) | 0.5 (1.270) |
| Inside Diameter | 0.6 (1.524) | 0.45 1.143) | 0.3 (0.762) |
| Hole Diameter | 0.25 (0.635) | 0.1875 (0.476) | 0.125 (0.318) |
| Web Thickness | 0.1 (0.254) | 0.075 (0.191) | 0.05 (0.127) |
| Disk Thickness | 0.25 (0.635) | 0.1875 (0.476) | 0.125 (0.318) |
| Frequency | 62,484 Hz | 83,287 Hz | 124,830 Hz |

Radial mode 42 is represented by equation $d=d_o \pm \Delta d \sin \omega_g t$. The outside diameter of modulator 10 at rest is $d_o$. The radians per second of the excitation voltage is "$w_g$". Axial mode 44, in terms of axial length or height 1 of modulator 10, is represented by equation $l=l_o \pm \Delta l \sin(\omega_g t - 180°)$, where $l_o$ is the radial length or height of modulator 10 at rest. Also, via electrical and physical properties of modulator 10, modes 42 and 44 are interrelated.

Figure 7:
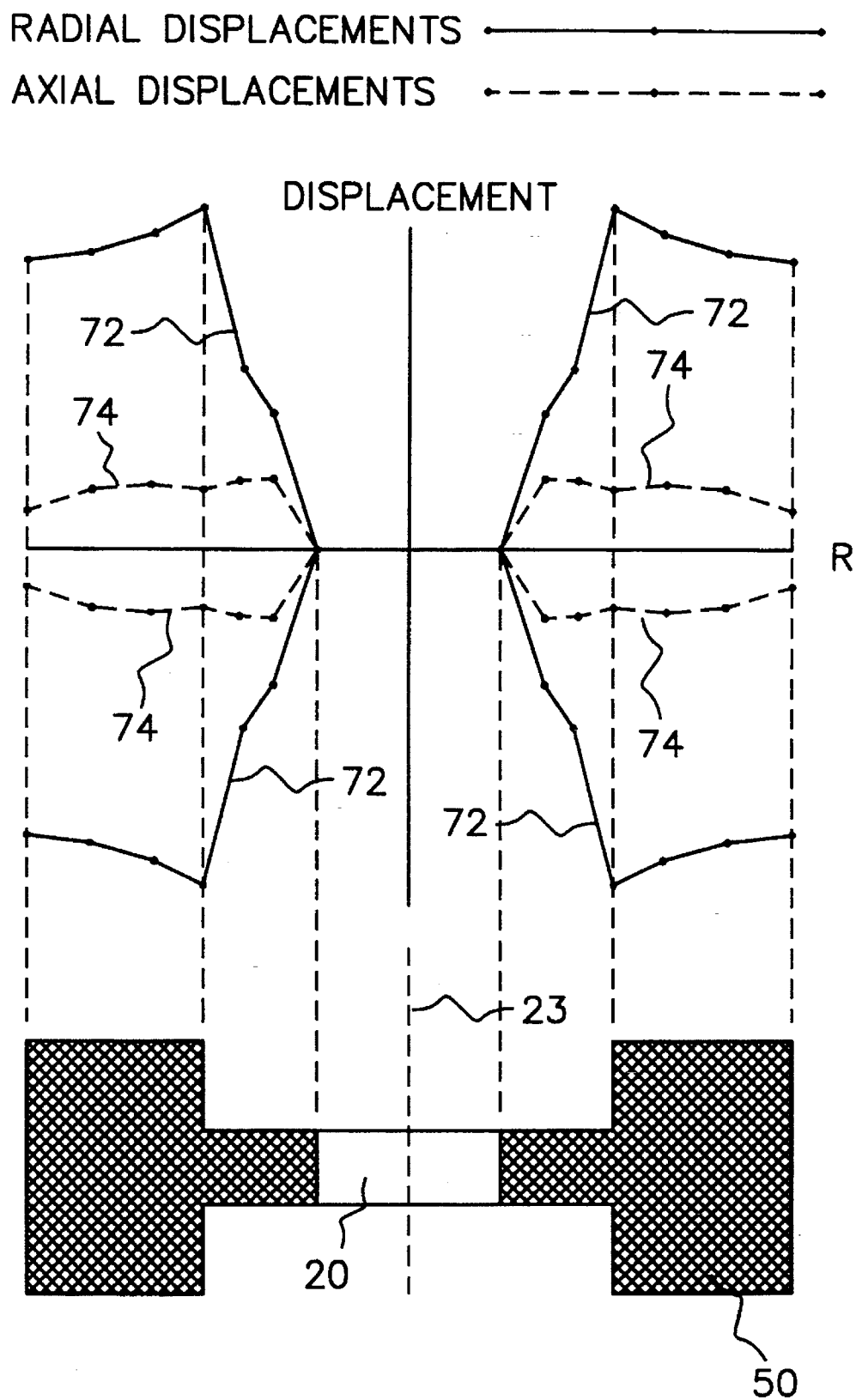
FIG. 7 is a graph of radial and axial displacements of the modulator.

FIG. 7 shows the relative displacements of radial vibration, with curve 72, relative to the distance from centerline 23 for mounted modulator 10. An outline of the modulator piezoelectric material 50 reveals the distance from centerline 23. Curves 74 of FIG. 7 similarly show the relative displacements of axial or longitudinal vibration for mounted modulator 10. The displacements are typically in tens of nanometers or a fraction of the wavelength of light propagating through fiber 32.

Figure 6A:
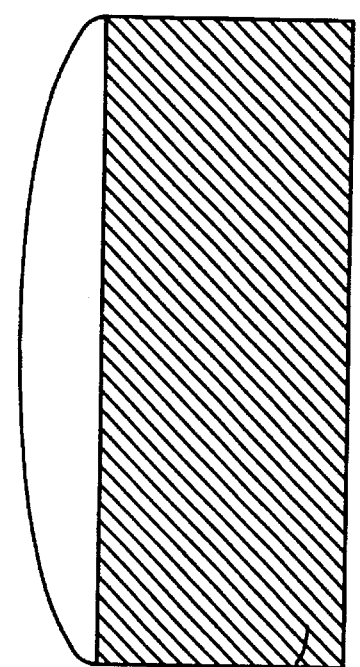
Figure 6B:
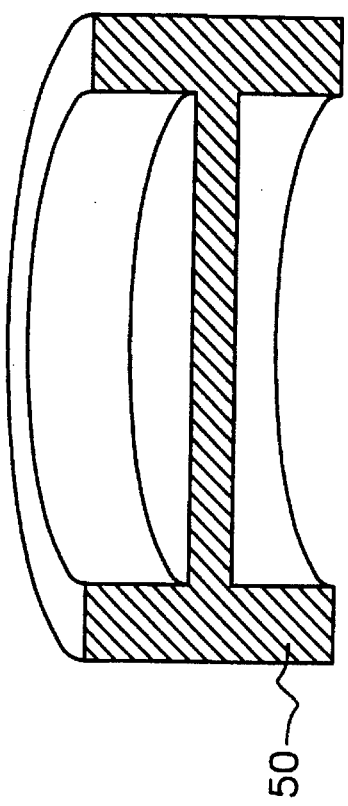
Figure 6C:
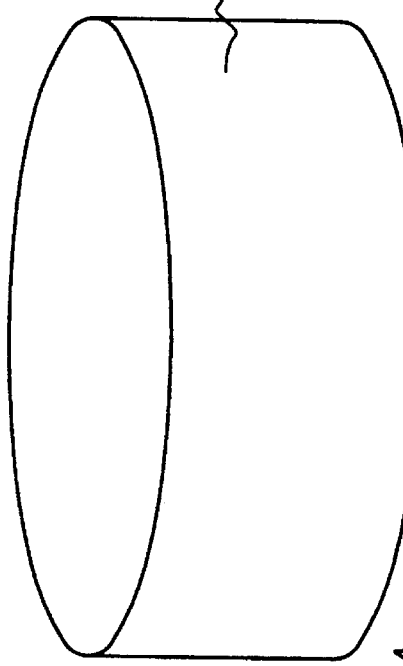
Figure 6D:
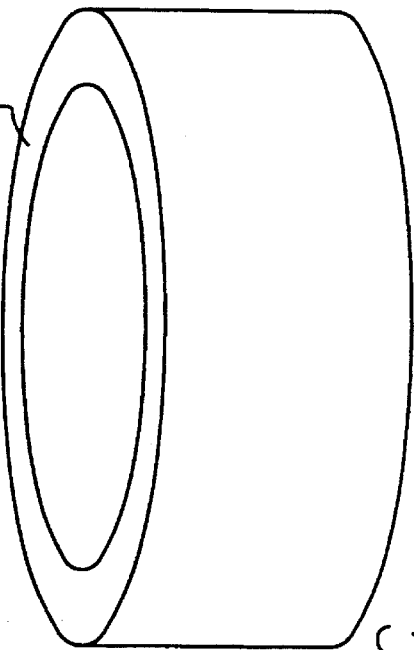
Figure 6I:
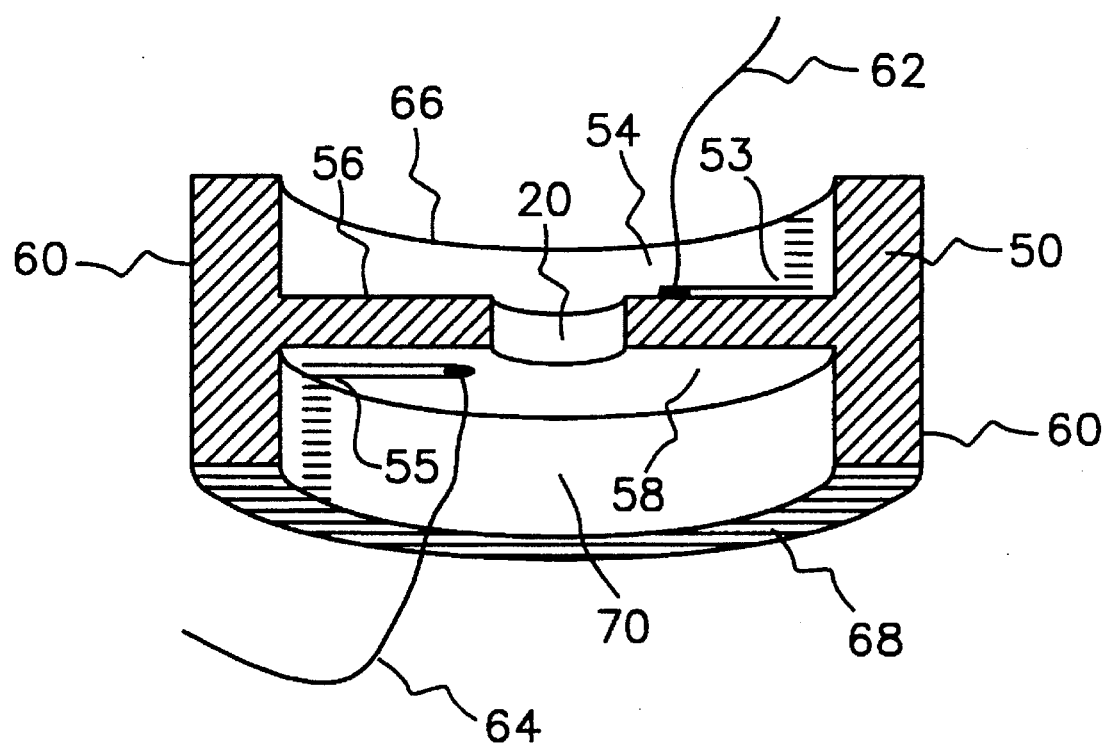

To fabricate modulator 10, one may start with a cylindrical body 48 of piezoelectric (PZT) material 50 (FIG. 6a) as illustrated by the cross-section of FIG. 6b. Cylinder 48 is ground into a wheel shape 52 (FIG. 6c) as illustrated by the cross-section of FIG. 6d. Then a center mounting hole 20 is drilled in wheel 52 as shown in FIG. 6e. Another form of fabrication is to mold modulator 10 into the shape as shown in FIGS. 6f and 6i or in FIG. 6g.

For exciting radial motion, an electrode may be deposited on surface 66. A conducting strip 53 for a lead connection 62 to the electrode is deposited on surfaces 54 and 56 in FIG. 6f. FIG. 6i shows a bottom perspective of the core in FIG. 6f. Another electrode may be deposited on surface 68 (parallel to surface 66). A conducting strip 55 for connection 64 to the other electrode is deposited on surfaces 70 and 58. The electrodes on the surfaces of the modulator core may be a thin film deposition of gold/platinum using a conductive silver epoxy to connect leads 62 and 64 to conducting strips 53 and 55, respectively. Ball bonding, or other techniques, may also be used for connecting leads to the conducting strips or electrodes.

"Poling" of modulator 10 of FIG. 3 or material 50 of FIGS. 6d–h is performed by heating material 16 or 50 and then applying an electric field measured in volts/millimeter across material 16 or 50 at the electrodes on surfaces 66 and 68 when the material is hot at a temperature near the Curie point (about 325 degrees C.) of the ferroelectric domains wherein the molecules are stirred up but the material does not melt. The electric field remains applied until material 16 or 50 cools down to room temperature at about 25° C., which may take about an hour. The dipoles of the ferroelectric domains in the material are aligned with one another parallel to the electric field, that is, the isotropic crystal structure (with domains having random orientation) is made anisotropic, which results in a strong piezoelectric effect in material 16 or 50. The direction of poling is applied parallel to cylindrical axis 23 or perpendicular to the radial direction of expansion of material 16 or 50, though in the related art the direction of poling is the same as that of radial modulator displacement caused by an ensuing piezoelectric effect. The forces of different directions in modulator 10 are coupled through Possion's ratio which is the constant of the material which is equal to the ratio of axial contraction to radial expansion when the material is compressed or stretched. In other words, a force along the x axis resulting in negative displacement results in a positive displacement along the y and z axes. It is a sort of bulging from the compression. The ratio may be 31 percent. An electric field is applied to modulator 10 axially, rather than radially as in the related art, to cause the modulator to radially stretch optic fiber 32 and phase modulate the light propagating in fiber 32.

A typical modulator 10 has an outside diameter of one inch (2.5 cm). Modulator 10 consists of about two meters of fiber wound on it in coil form, which amounts to about 25 turns. In fiber optic gyro applications for a modulation depth of $\pi/2$, the total stretch variation for the modulator 10 fiber 32 is $$\lambda/4 \cong 2\pi \cdot \Delta R \cdot N \cdot n \frac{\sin \omega_g \tau}{2}$$

where $\lambda$ is the wavelength of the modulated light, $\Delta R$ is the peak change in radius of the modulator when modulating, N is the number of turns of fiber 32 on modulator 10, n is the refraction index of the fiber 32 core, $w_g$ is $2\pi f_g$ where $f_g$ is the frequency of the modulator, and $\tau$ is the transit time of the light signal in the optic fiber sensing coil of a fiber optic gyro incorporating modulator 10.

For phase modulator applications, the light phase modulation $\Delta f$ depends on the stretch as $$\Delta \phi \cong \frac{2\pi \cdot \Delta R \cdot N \cdot n}{\lambda}.$$

Another possible approach would be to mold material 50 to a bell shape as in FIG. 6g, and then sinter the material, deposit the electrodes, then do a poling step. This approach is more expedient than a machining approach for high quantities of production. However, machining results in tighter dimensional tolerances. FIG. 6h shows a cylindrical shaped modulator which has a "stiff" center mount. Yet, a modulator may be machined from the cylindrical shaped modulator into a "wheel-" or "bell-" shaped modulator, but the poling preferably be done prior to the machining of material 50 for high quantities of production.

We claim:

1. A rotation sensor capable of sensing rotation about an axis of a coiled optical fiber, said sensing based on electromagnetic waves propagating in opposite directions in said coiled optical fiber which impinge on a photodetector with a phase relationship indicative of rotation rate about the axis of said coiled fiber, said rotation sensor comprising:

a bias optical phase modulator means, being positioned in an optical path within said coiled optical fiber wherein the electromagnetic waves are propagating in opposite directions and having a first portion of said coiled optical fiber wound on said bias optical phase modulator, for phase modulating the electromagnetic waves passing through said bias optical phase modulator means, so as to provide a varying phase difference between the electromagnetic waves in response to a corresponding electrical signal provided to the input of said bias optical phase modulator means, which if the corresponding electrical signal is substantially periodic at a selected fundamental frequency, the varying phase difference has a fundamental and first frequency at a first amplitude and has a second frequency twice that of the fundamental frequency, at a second amplitude;

a phase modulation generator, having an output connected to the input of said bias optical phase modulator means, for providing the corresponding electrical signal to the input of said bias optical phase modulator means; and a signal component selection means, having a detection input connected to said photodetector, for receiving from said photodetector a signal representative of any phase relationship including any varying phase difference between the electromagnetic waves propagating in opposite directions in said coiled optical fiber and impinging on said photodetector, said signal component selection means providing a rotation rate indicating signal at an output based on the varying phase difference having the fundamental and first frequency at the first amplitude and having the second frequency at the second amplitude; and wherein:

a significant amount of the second amplitude of the second frequency is caused by a lack of linearity between the electrical signal provided to the input of said bias optical phase modulator means and the varying phase difference; and said bias optical phase modulator means has a centrally located robust mounting for reducing the significant amount of the second amplitude.

2. The rotation sensor of claim 1 wherein the bias optical phase modulator means having the robust mounting, comprises:

a core, wherein:

said core is a hollow cylindrical structure having first and second end surfaces, an outside surface, a circular perimeter about the outside surface, an inside surface, an approximately constant thickness between the outside surface and the inside surface, and a web adhered to the inside surface cylindrical structure;

the web has a mounting means for attachment to a fastener;

the mounting means is approximately equidistant from the circular perimeter; and said core is comprised of a piezoelectric material;

a first electrode situated on the first end surface;

a second electrode situated on the second end surface;

a first conducting lead connected to said phase modulation generator and attached to the web;

a second conducting lead connected to said phase modulation generator and attached to the web;

a first conducting strip connected to said first electrode and first conducting lead;

a second conducting strip connected to said second electrode and second conducting lead; and the first portion of said coiled optic fiber wound on the outside surface of said core.

3. The rotation sensor of claim 2 wherein said core is poled in a direction perpendicular to the first and second end surfaces of said core.

4. A rotation sensor comprising:

a coiled optical fiber having an axis about which rotation can be sensed due to a phase relationship between electromagnetic waves propagating in opposite directions in said coiled optical fiber;

a fiber optic phase modulator, having a first portion of said coiled optical fiber wound on said fiber optic phase modulator, for providing a varying phase difference between the electromagnetic waves corresponding to a first electrical signal at a first frequency provided to said fiber optic phase modulator;

a modulation signal generator, connected to said fiber optic phase modulator, for providing the first electrical signal at the first frequency; and a detection means, connected to said coiled optical fiber, for detecting the phase relationship and the varying phase relationship between the electromagnetic waves, and for providing a second electrical signal, the second electrical signal indicative of the rotation about the axis of said coiled optical fiber, based on the phase relationship and the varying phase relationship having the first frequency at a first amplitude and having a second frequency at a second amplitude, the second frequency indicating a lack of correspondence between the first electrical signal and varying phase difference, the lack of correspondence being proportional to the second amplitude; and wherein said fiber optic phase modulator has a round-like shaped device and a centrally located mounting for reducing the second amplitude of the second frequency.

5. The rotation sensor of claim 4 wherein said fiber optic phase modulator comprises:

a wheel-like shaped structure having an outside surface, having a rim with a first diameter at the outside surface and a second diameter at an inside surface, having first and second basal surfaces approximately perpendicular to the outside and inside surfaces, a first width of the outside surface, a first thickness between the outside and inside surfaces, having a center structure attached to the inside surface;

the first portion of said coiled optical fiber wound on the outside surface around the rim;

the centrally located mounting having a fastener means for mounting said modulator, situated on the center structure, approximately equidistant from the inside surface;

a first electrode attached to the first basal surface; and a second electrode attached to the second basal surface; and wherein said wheel-like structure is composed of piezoelectric material.

6. The rotation sensor of claim 5 wherein said modulator is poled by applying voltage across said first and second electrodes from a time when said wheel-like structure is hot to a second time when said wheel-like structure has cooled down.

7. The rotation sensor of claim 6 further comprising:

a first conducting lead, connected to said modulation signal generator, situated on the center structure near said fastener means;

a second conducting lead, connected to said modulation signal generator, situated on the center structure near said fastener means;

a first conducting strip situated on said wheel-like structure and connected to the first electrode and the first conducting lead; and a second conducting strip situated on said wheel-like structure and connected to the second electrode and the second conducting lead.

8. The rotation sensor of claim 4 wherein said fiber optic phase modulator comprises:

a cylinder having first and second end surfaces, having an outside surface with a first diameter, and an inside surface, and a longitudinal length between the first and second end surfaces;

a web, having a center, attached to the inside surface of said cylinder, situated between the first and second end of said cylinder;

a fastener, situated at the center of said web, for mounting said modulator;

a first electrode attached to the first end surface;

a second electrode attached to the second end surface;

the first portion of said coiled optic fiber wound on the outside surface of said cylinder;

a first lead connected to said first electrode and to said modulation signal generator; and a second lead connected to said second electrode and to said modulation signal generator.

9. The rotation sensor of claim 8, wherein:

said cylinder and said web are a piezoelectric fixture; and wherein said piezoelectric fixture has a vibrational node close to zero amplitude, when said piezoelectric fixture is in an excitation state.

10. The rotation sensor of claim 9 wherein:

said piezoelectric fixture is poled in a direction perpendicular to the first and second end surfaces; and said piezoelectric fixture is excited in a direction perpendicular to the first and second end surfaces with a modulation signal applied to said first and second leads.

11. A fiber optic phase modulator having a robust mounting, comprising:

a core, wherein:
  said core is a hollow cylindrical structure having first and second end surfaces, an outside surface, a circular perimeter about the outside surface, an inside surface, an approximately constant thickness between the outside surface and the inside surface, and a web adhered to the inside surface cylindrical structure;
  the web has a mounting means for attachment to a fastener;
  the mounting means is approximately equidistant from the circular perimeter; and
  said core is comprised of a piezoelectric material;

a first electrode situated on the first end surface;

a second electrode situated on the second end surface;

a first conducting lead attached to the web;

a second conducting lead attached to the web;

a first conducting strip connected to said first electrode and first conducting lead;

a second conducting strip connected to said second electrode and second conducting lead; and at least one winding of optic fiber wound on the outside surface of said core.

12. The modulator of claim 11 wherein:

said core is poled with an electric field in a direction perpendicular to the first and end surfaces of said core from a time said core is thermally hot to a time said core cools to room temperature, and said modulator is operated by applying an electrical modulation signal to the first and second leads.

13. A fiber optic phase modulator having a robust mounting, comprising:

a wheel-like shaped structure having an outside surface, having a rim with a first diameter at the outside surface and a second diameter at an inside surface, having first and second basal surfaces approximately perpendicular to the outside and inside surfaces, a first width of the outside surface, a first thickness between the outside and inside surfaces, having a center structure attached to the inside surface;

an optic fiber wound on the outside surface around the rim;

a fastener means for mounting said modulator, situated on the center structure, approximately equidistant from the inside surface;

a first electrode attached to the first basal surface; and a second electrode attached to the second basal surface; and wherein said wheel-like structure is composed of piezoelectric material.

14. The modulator of claim 13 wherein said modulator is poled by applying voltage across said first and second electrodes from a time when said wheel-like structure is hot to a second time when said wheel-like structure has cooled down.

15. The modulator of claim 13 further comprising:

a first conducting lead situated on the center structure near said fastener means;

a second conducting lead situated on the center structure near said fastener means;

a first conducting strip situated on said wheel-like structure and connected to the first electrode and the first conducting lead; and a second conducting strip situated on said wheel-like structure and connected to the second electrode and the second conducting lead.

16. A fiber optic phase modulator having a robust mounting, comprising:

a cylinder having first and second end surfaces, having an outside surface with a first diameter, and an inside surface, and a longitudinal length between the first and second end surfaces;

a web, having a center, attached to the inside surface of said cylinder, situated between the first and second end of said cylinder;

a fastener, situated at the center of said web, for mounting said modulator;

a first electrode attached to the first end surface;

a second electrode attached to the second end surface;

an optic fiber wound on the outside surface of said cylinder;

a first lead connected to said first electrode; and a second lead connected to said second electrode.

17. The fiber optic phase modulator of claim 16, wherein:

said cylinder and said web are a piezoelectric fixture; and wherein said piezoelectric fixture has a vibrational node close to zero amplitude, when said piezoelectric fixture is in an excitation state.

18. The modulator of claim 17 wherein:

said piezoelectric fixture is poled in a direction perpendicular to the first and second end surfaces; and said piezoelectric fixture is excited in a direction perpendicular to the first and second end surfaces with a modulation signal applied to said first and second leads.

19. A method for fabricating a fiber optic modulator having a robust mounting, comprising:

obtaining a quantity of poled PZT material having a shape of a cylinder or disk having first and second ends, a first diameter and a first length, the first end having a first film of conducting material on a first surface and the second end having a second film of conducting material on a second surface;

removing the PZT material of a first region at the first end, the first region having a second diameter and a first depth;

removing the PZT material of a second region at the second end, the second region having a third diameter and a second depth;

removing the PZT material of a third region situated between the first and second regions, the third region having a fourth diameter and a third depth;

wherein:

the first, second third and fourth diameters are concentric to one another;

the first diameter is greater than the second diameter;

the second diameter is greater than the fourth diameter;

the second diameter is approximately equal to the third diameter; and a sum of the first, second and third depths is about equal to the first length;

depositing a first conducting strip from the first film of conducting material, to a third surface at the first depth;

depositing a second conducting strip from the second film of conducting material, to a fourth surface at the second depth;

winding at least one turn of optical fiber on a fifth surface at the first diameter;

a first lead connected to the first conducting strip on the third surface at the first depth; and a second lead connected to the second conducting strip on the fourth surface at the second depth.

20. The method of claim 19 wherein the poled PZT material is poled by:

heating the PZT material; and applying an electric field across the PZT material.

21. The method of claim 20 wherein:

the PZT material is heated to a temperature near the Curie point of the PZT material; and the electric field is applied between the first and second films of conducting material and to the PZT material when the PZT material is at the temperature near the Curie point, the PZT material is left to cool down, and the electric field remains applied to the PZT material until the PZT material cools down to room temperature.

22. The method of claim 21 wherein the PZT material is formed from a mold.

23. The rotation sensor of claim 4 wherein said fiber optic phase modulator comprises:

a solid cylinder having first and second end surfaces, having an outside surface with a first diameter and a longitudinal length between the first and second end surfaces;

a first electrode attached to the first end surface;

a second electrode attached to the second end surface;

a fastener, situated at the center of said solid cylinder, for mounting said modulator;

the first portion of said coiled optic fiber wound on the outside surface of said cylinder;

a first lead connected to said first electrode and to said modulation signal generator; and a second lead connected to said second electrode and to said modulation signal generator.

24. The rotation sensor of claim 23, wherein:

said solid cylinder is a piezoelectric fixture; and wherein said piezoelectric fixture has a vibrational node close to zero amplitude, when said piezoelectric fixture is in an excitation state.

25. The rotation sensor of claim 24 wherein:

said piezoelectric fixture is poled in a direction perpendicular to the first and second end surfaces; and said piezoelectric fixture is excited in a direction perpendicular to the first and second end surfaces with a modulation signal applied to said first and second leads.

26. A fiber optic phase modulator having a robust mounting, comprising:

a core, wherein:

said core is a solid cylindrical structure having first and second end surfaces, an outside surface, and a circular perimeter about the outside surface;

the core has a mounting means for attachment to a fastener;

the mounting means is approximately equidistant from the circular perimeter; and said core is comprised of a poled piezoelectric material;

a first electrode situated on the first end surface;

a second electrode situated on the second end surface;

a first conducting lead attached to the first electrode;

a second conducting lead attached to the second electrode; and at least one winding of optic fiber wound on the outside surface of said core.

27. The modulator of claim 26 wherein:

said core is poled with an electric field in a direction perpendicular to the first and end surfaces of said core from a time said core is thermally hot to a time said core cools to room temperature, and said modulator is operated by applying an electrical modulation signal to the first and second leads.

* * * * *